(12) United States Patent
Wunsch et al.

(10) Patent No.: US 7,776,212 B2
(45) Date of Patent: Aug. 17, 2010

(54) WATER SCREEN SYSTEM WITH BOOT SEAL

(75) Inventors: Philip J. Wunsch, New Orleans, LA (US); Gilbert J. MacLachlan, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 1191 days.

(21) Appl. No.: 11/308,257

(22) Filed: Mar. 14, 2006

(65) Prior Publication Data
US 2007/0215532 A1   Sep. 20, 2007

(51) Int. Cl.
  *E03F 5/14* (2006.01)
(52) U.S. Cl. .................. 210/158; 210/160; 210/400
(58) Field of Classification Search .................. 210/158, 210/160, 161, 400, 541
See application file for complete search history.

(56) References Cited

U.S. PATENT DOCUMENTS

| | | | | |
|---|---|---|---|---|
| 658,196 | A | * | 9/1900 | Whitney ..................... 210/158 |
| 1,417,205 | A | * | 5/1922 | Roddy ........................ 210/160 |
| 1,435,770 | A | * | 11/1922 | Welser ........................ 210/158 |
| 3,093,578 | A | | 6/1963 | Hofmeister .................. 210/91 |
| 3,802,565 | A | | 4/1974 | Hughes et al. ............... 210/160 |
| 3,868,324 | A | | 2/1975 | Taylor et al. |
| 4,176,984 | A | | 12/1979 | Sommers ..................... 405/81 |
| 4,186,091 | A | | 1/1980 | Sutton ......................... 210/79 |
| 4,188,294 | A | | 2/1980 | Hagihara ..................... 210/160 |
| 4,360,426 | A | | 11/1982 | Wetzel ........................ 210/160 |
| 4,582,601 | A | | 4/1986 | Strow et al. ................. 210/161 |
| 5,415,766 | A | | 5/1995 | Quick et al. ................. 210/160 |
| 5,489,378 | A | | 2/1996 | Cheesman et al. ........... 210/90 |
| 5,501,793 | A | | 3/1996 | Cheesman et al. .......... 210/160 |
| 5,565,093 | A | * | 10/1996 | Frankenberger ............. 210/158 |
| 5,800,701 | A | * | 9/1998 | Larsen ....................... 210/158 |
| 6,187,184 | B1 | | 2/2001 | Reetz et al. ................. 210/155 |

(Continued)

FOREIGN PATENT DOCUMENTS

FR         551055 A         3/1923

(Continued)

OTHER PUBLICATIONS

European Patent Office, "Search Report of PCT/US07/62098," Oct. 26, 2007, European Patent Office, Rijswijk, the Netherlands.

*Primary Examiner*—Christopher Upton
(74) *Attorney, Agent, or Firm*—James T. Cronvich

(57) ABSTRACT

A boot seal for a vertically traveling water screen and a method forming a boot seal. The boot seal comprises a bent plate that extends from an attachment end to a free end. The attachment end is attached to a frame mounted at the bottom of a channel of water flowing through the water screen. The boot seal is positioned just upstream of the upward-moving upstream face of the water screen. The free end of the bent plate in a rest position is positioned close to or lightly touching the upstream face of the water screen. The bent plate has a concave surface facing the water screen. The bent plate acts as a cam follower to a passing lift element's cam. As the lift element slides along the concave cam surface, the lift element pivots the boot plate in an upstream direction against a spring bias. When the lift element clears the boot plate, the boot plate springs back to its rest position.

13 Claims, 5 Drawing Sheets

U.S. PATENT DOCUMENTS

| | | | |
|---|---|---|---|
| 6,280,612 B1 * | 8/2001 | Kroos | 210/158 |
| 6,942,789 B2 * | 9/2005 | Wilcher et al. | 210/158 |
| 7,147,784 B2 * | 12/2006 | Seidl | 210/161 |
| 2004/0112810 A1 * | 6/2004 | Frommann | 210/158 |
| 2006/0032798 A1 | 2/2006 | DePaso et al. | 210/160 |
| 2006/0037897 A1 | 2/2006 | Jackson | 210/158 |
| 2007/0209985 A1 | 9/2007 | Mellegard et al. | |

FOREIGN PATENT DOCUMENTS

| | | |
|---|---|---|
| FR | 2503756 A | 10/1982 |

* cited by examiner

WATER SCREEN SYSTEM WITH BOOT SEAL

BACKGROUND

The invention relates generally to water screens and, more particularly, to traveling water screen systems with boot seals.

Water drawn into an industrial plant from a lake or river must be filtered to prevent debris from fouling equipment and causing damage. Traveling water screens are used to filter out and remove debris and fish from an influent channel before the debris can enter the plan or fish impinged on the upstream face of the screen die. A typical traveling water screen comprises a motor-driven screen, such as a foraminous conveyor belt, extending laterally across the width of the channel and vertically from the bottom of the channel to a height above the level of the water to ensure that all the water flowing in the channel passes through the screen. The screen travels a circuitous path around a motor-driven head shaft above the level of the water and a lower idle shaft in a boot section of the water screen at the bottom of the channel. The screen travels upward along the upstream portion of its circuitous path and downward along the downstream portion. A series of lift elements, such as baskets, scoops, or flights, extending outward of the screen at periodic intervals along its length lift debris or fish trapped on the upward-moving upstream portion of the water screen out of the channel for disposal in the case of debris and safe transit in the case of fish. Seals prevent unfiltered water containing fish and debris from flowing into the boot section of the water screen system between the screen and the bottom of the channel. One kind of seal, shown in FIG. 1, comprises an elastomeric or rubber flap 10 extending horizontally from a fastened end 11 at the bottom of the channel upstream of a water screen 14 to a free end 12 close to the upstream face 13 of the water screen in its boot section 15. A lift element 16 approaches the flap in a vertical direction 17 forming a 90° contact angle γ with the flap at the point of contact P. As the lift element moves past the flap, the flap flexes, its free end sliding along the tip 18 of the lift element to maintain the seal. Once the lift element passes, the flap returns to its unflexed, sealed position with its free end close to the upstream face of the screen. The flap must be flexible enough to bend almost 90° at its contact point to allow the lift element to pass. But, to provide an adequate seal and endure the continuous flexing, the flap must be fairly stiff and durable, which puts a lot of pressure on the lift elements as they pass. The repetitive contact between the flap and the lift elements wears or damages the lift elements and the flap and weakens or destroys the seal.

SUMMARY

A water screen system embodying features of the invention including a novel boot seal overcomes these shortcomings. In one aspect of the invention, a boot seal forms a seal between the upstream side of a vertically traveling water screen and the bottom of a channel of water flowing downstream through the water screen. The boot seal comprises a frame affixed at the channel bottom upstream of the boot section of the water screen system. A bent plate extends from an upper edge at or near the outer screen surface to a lower edge. A spring forms a hinged attachment between the lower edge of the bent plate and the frame and biases the upper edge of the bent plate toward the water screen.

Another aspect of the invention provides an improved boot seal for a water screen system in which a vertically traveling water screen, comprising a foraminous belt with lift elements extending outwardly from an outer screen surface, transitions from a downward downstream path to an upward upstream path around a wheel disposed at a channel bottom boot section forming a gap between the outer screen surface and the bottom of the channel. The improved boot seal comprises a bent plate extending from a lower edge to an upper edge at or near the outer screen surface. A hinge is attached to the bent plate at the lower edge at a position upstream of the upward upstream path of the water screen. The hinge includes a spring that biases the bent plate toward the water screen. The improved boot seal blocks debris from entering the gap at the upstream end of the boot section.

In another aspect of the invention, a traveling water screen system comprises a vertically traveling water screen having a foraminous belt with lift elements extending outwardly from an outer screen surface. The belt changes direction from moving downward along a downstream path to moving upward along an upstream path around a wheel disposed in a channel bottom boot section. A gap is formed below the outer screen surface and the bottom of the channel. A boot seal blocks debris from entering the gap at the upstream end of the boot section. The boot seal comprises a frame affixed at the channel bottom upstream of the boot section of the water screen system. A boot plate extends from an upper edge at or near the outer screen surface to a lower edge and defines a concave cam surface facing the water screen. A spring hinge is attached between the boot plate at the lower edge and the frame to bias the boot plate toward the water screen, which allows the boot plate to pivot away from the outer screen surface against the bias as a lift element slides along the concave cam surface of the boot plate. Thus, the boot seal blocks debris from entering the gap at the upstream end of the boot section.

In yet another aspect of the invention, a method is provided for forming a seal at the boot section of a water screen system between the upstream outer surface of a traveling water screen and the bottom of a channel of water. The method comprises: (a) mounting a plate at the bottom of a channel upstream of the upward-traveling outer surface of a water screen at a hinge; (b) positioning the distal edge of the plate opposite the hinge at the outer surface of the water screen; and (c) biasing the plate toward the water screen to allow the distal edge of the plate to ride along the outer surface of the upward-traveling water screen and any salient structures protruding outward of the outer surface as the plate pivots at the hinge.

BRIEF DESCRIPTION OF THE DRAWINGS

These features, aspects, and advantages of the invention are better understood by reference to the following description, appended claims, and accompanying drawings, in which:

DETAILED DESCRIPTION

Figure 1:
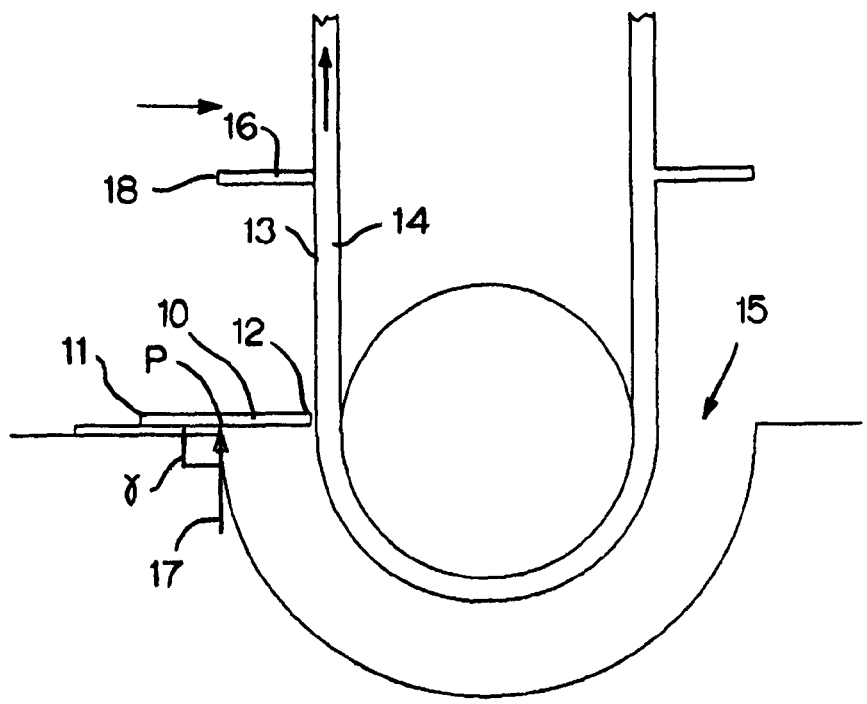
FIG. 1 is a side elevation view of the boot section of a traveling water screen showing a conventional flap seal.
Figure 2:
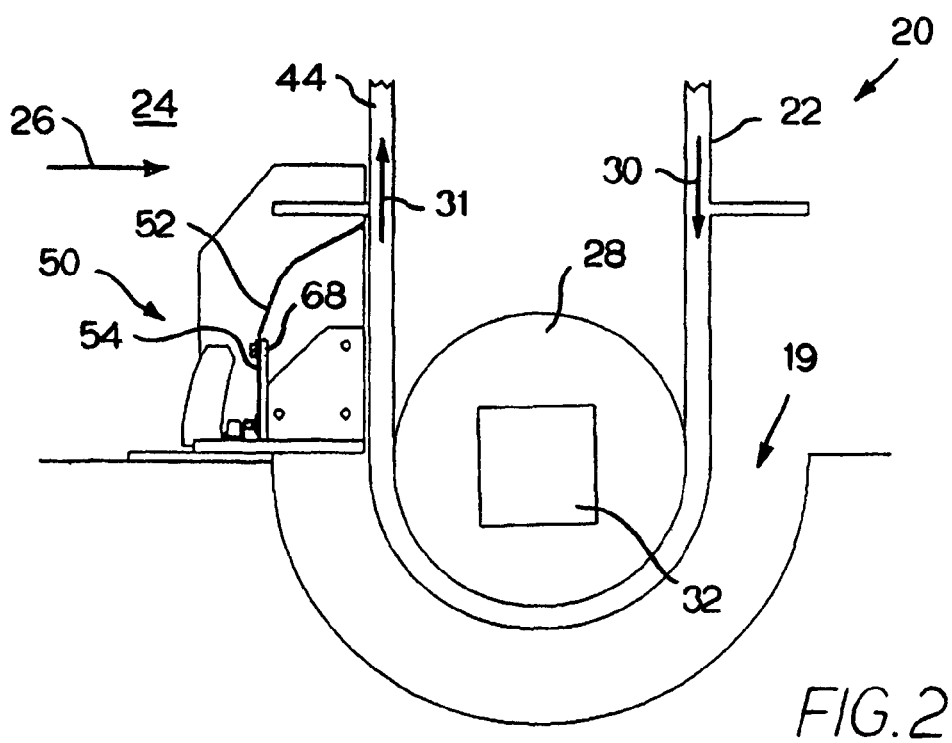
FIG. 2 is a side elevation view of a portion of a traveling water screen system embodying features of the invention including an improved boot seal.

The boot section 19 of a vertical traveling water screen embodying features of the invention is shown in FIG. 2. The water screen system 20 includes a traveling water screen 22 positioned in a channel 24 through which water flows in the direction of arrow 26. One or more wheels 28, such as sprockets, pulleys, or drums, transition the water screen from a downward downstream path 30 to an upward upstream path 31. The wheel in the boot section rotates on a central shaft 32 whose ends are supported for rotation in side portions of a water screen frame (not shown). Opposite the boot section of the water screen system is a head section above the surface of the water in the channel. A motor-driven drive wheel in the head section drives the water screen and transitions it from the upstream path to the downstream return path.

Figure 3:
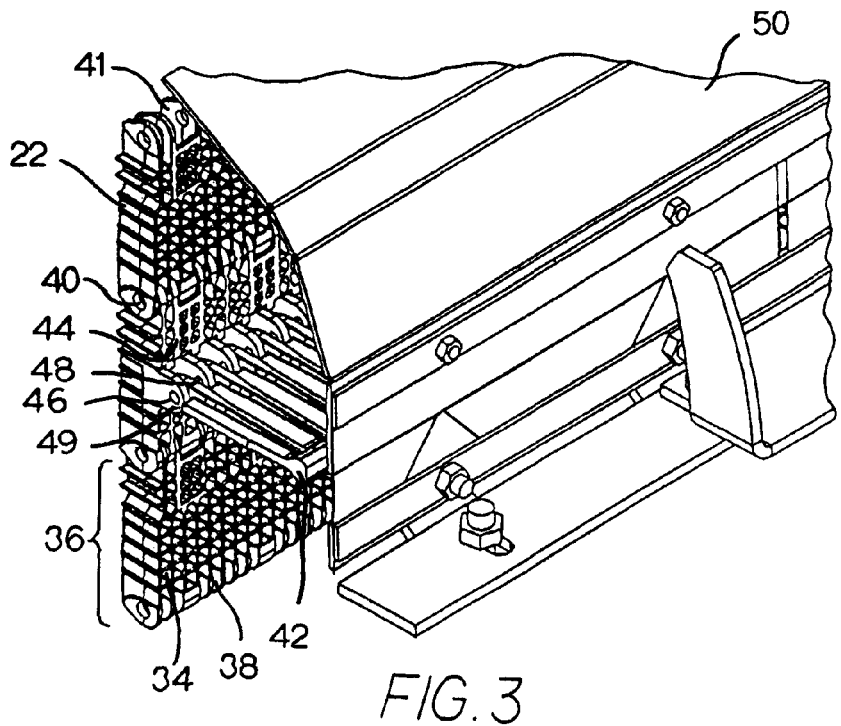
FIG. 3 is an isometric view of an upstream lower edge portion of the water screen system of FIG. 2.

The exemplary water screen 22 shown in FIG. 3 is realized as a foraminous conveyor belt with many openings 34 through the thickness of the belt to form a screen. Although the belt may be a flat belt or a metal belt, it is preferably a modular polymeric belt constructed of rows 36 of belt modules 38 interconnected by hinge rods 40 through interleaved offset hinge eyes 41 between each row. Drive structure formed on the inside surface of the circuitous belt loop is engaged by the drive and idle wheels to advance the belt. Alternatively, the belt could include metal chains along each side driven by drive and idle sprockets. The modules are preferably arranged in a bricklay pattern for strength. Lift elements, such as flights 42, extend outward of the outer side 44 of the belt across its width. Rows of the flights are periodically spaced along the length of the belt. The flights may be integrally molded with the belt modules, but preferably are removably attached to the belt, such as by a connection rod 46 received in aligned apertures in the flights and holes 48 in flight attachment structure 49 on the belt. The flights are shown in this example spaced by intervening flightless belt rows. Alternative lift elements include, without limitation, scoops, or buckets for lifting debris or fish clear of the channel.

Figure 4:
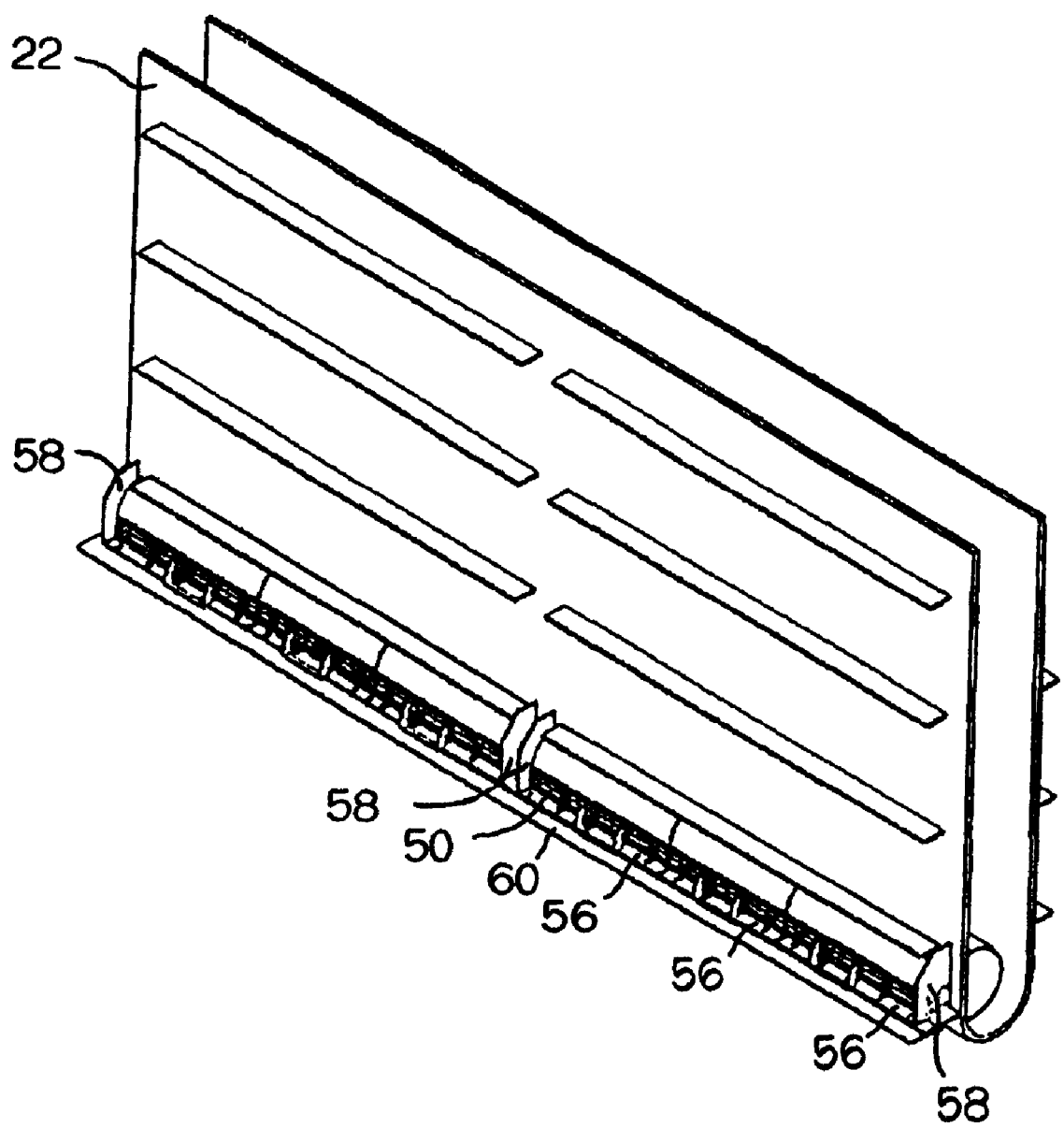
FIG. 4 is an isometric view of the boot seal of the water screen system of FIG. 2.
Figure 5A:
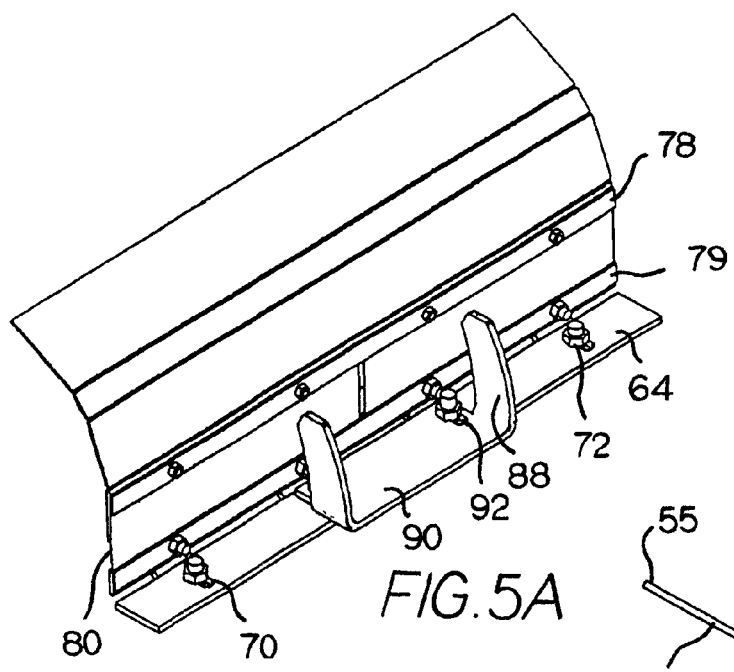
FIGS. 5A-5D are isometric, side elevation, front elevation, and rear elevation views of one section of the boot seal of FIG. 3.
Figure 5B:
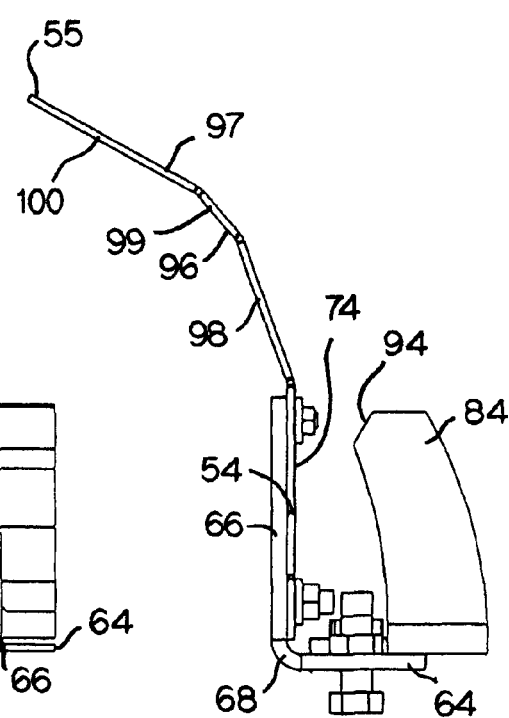
Figure 5C:
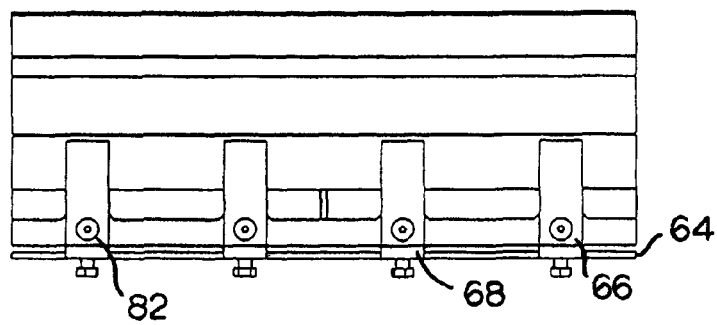
Figure 5D:
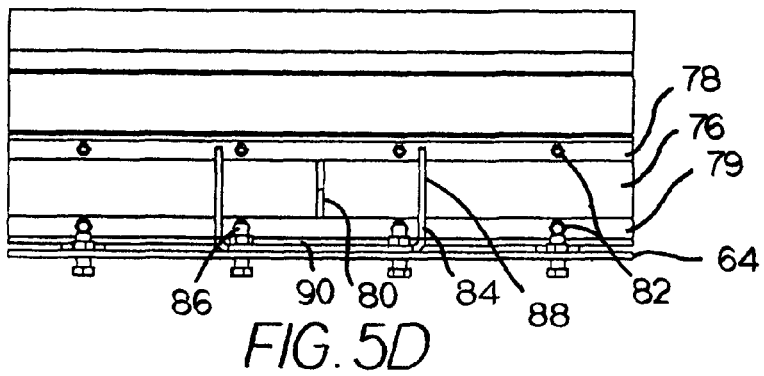

To prevent water flowing in the channel from flowing beneath the water screen, a boot seal 50 is mounted to the bottom of the channel 24 just upstream of the water screen 22, as shown in FIG. 2. The seal includes a boot plate 52 preferably made of stainless steel or another durable material suitable for an underwater environment. The boot plate extends from an attachment end 54 to a free end 55 preferably close to the outer face 44 of the water screen. (The free end could alternatively be positioned to touch the outer face of the screen.) The close contact limits the water flow below the water screen and prevents fish and significant debris from passing into and clogging the boot section 19. The boot seal 50, as shown in FIG. 4, comprises a series of individual boot seal sections 56 across the width of the water screen. In the example, the boot seal sections are arranged in two groups of three sandwiched between end plates 58. The boot seal is attached to a mounting plate 60 or other mounting structure on the bottom of the channel.

Details of a boot seal section are shown in FIGS. 2 and 5A-5D. In addition to the end plates, a boot seal frame 62 includes a base plate 64 and a series of vertical supports 66 extending upward at the downstream end of the base plate at bends 68. Mounting holes 70 in the base plate admit mounting hardware such as bolts through nuts 72. The holes are slotted to allow the boot seal's position relative to the water screen to be adjusted. The boot plate 52 has a lower facet 74 extending from the attachment end 55 toward the free end 54. In an unflexed condition of the boot plate, its lower facet 74 rests against the vertical support 66. The free end 55 of the boot plate is then above and downstream of the attachment end. Thin sheets of spring steel 76 are sandwiched between the lower facet of the boot plate and an upper clamp bar 78 at an upper end and between a spacer plate 80 and a lower clamp bar 79 at a lower end. The spacer plate's thickness is the same as the boot plate's thickness. Fastening hardware 82 tightens the clamps to retain the spring sheets in place. The spring steel allows the boot plate to back bend about a pivot edge at its attachment end 54. Thus, the spring forms a hinge at the attachment end of the boot plate and biases the boot plate toward the water screen. A stop 84 is attached to the base plate 64 by mounting hardware 86. The stop includes a pair of upstanding arms 88 extending from an intermediate portion 90 mounted to the base plate. Slotted holes 92 in the intermediate portion allow the position of the stop relative to the boot plate to be adjusted to set the range of back bend. When the boot plate is bent back fully, it rests against a stop face 94 at an upper end of the arms.

Figure 6:
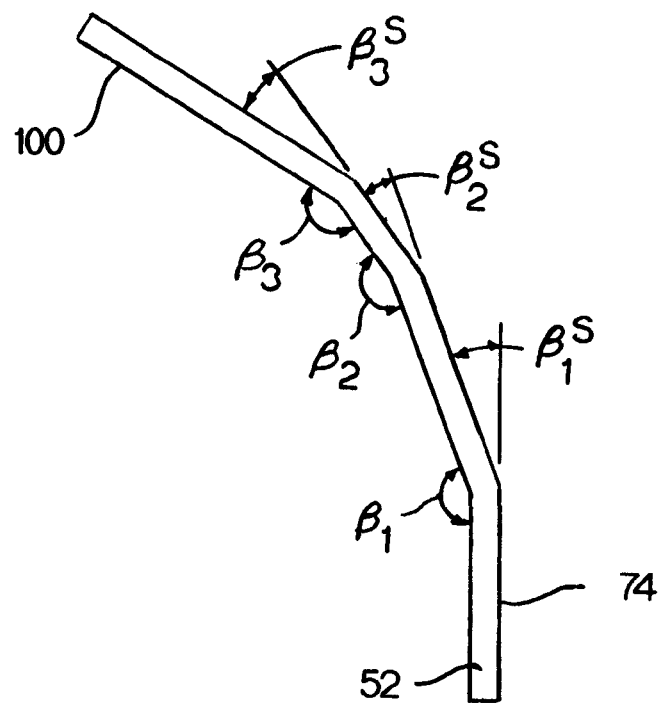
FIG. 6 is a side elevation view of the boot plate in the boot seal of FIGS. 5A-5D.
Figure 7:
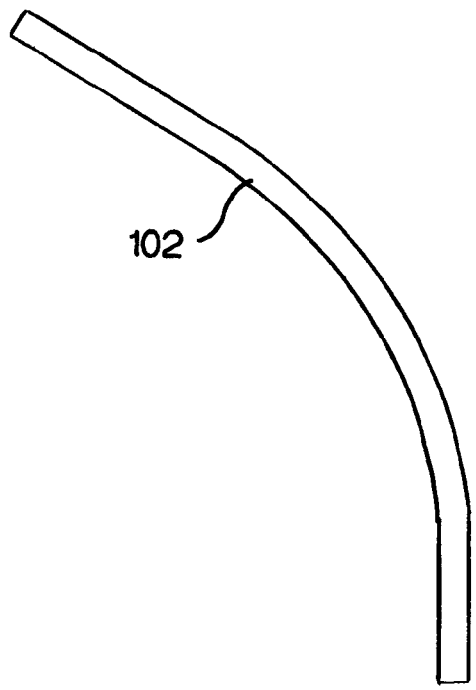
FIG. 7 is a side elevation view of another version of boot plate with curved surfaces usable in a boot seal as in FIG. 2.

The downstream surface 96 of the boot plate 52 is concave, and its opposite upstream surface 97 is convex. The boot plate shown in the drawings is bent along three lines dividing the plate into four facets: the lower facet 74, a proximal facet 98, a transition facet 99, and a distal facet 100. The bend angles $\beta_1, \beta_2, \beta_3$ shown in FIG. 6 are all closer to 180° than to 90° for the slight bends shown. The sum of the supplementary angles $\beta^s_1, \beta^s_2, \beta^s_3$ are consequently less than 90°, guaranteeing that the distal facet 100 slopes upward toward the water screen. Although the boot plate shown has three bend angles, a boot plate could be made with fewer or more bend angles and facets. Furthermore, the boot plate could be a continuously curved bent plate 102, without planar facets, as illustrated in FIG. 7.

Figures 8A, 8B, 8C:
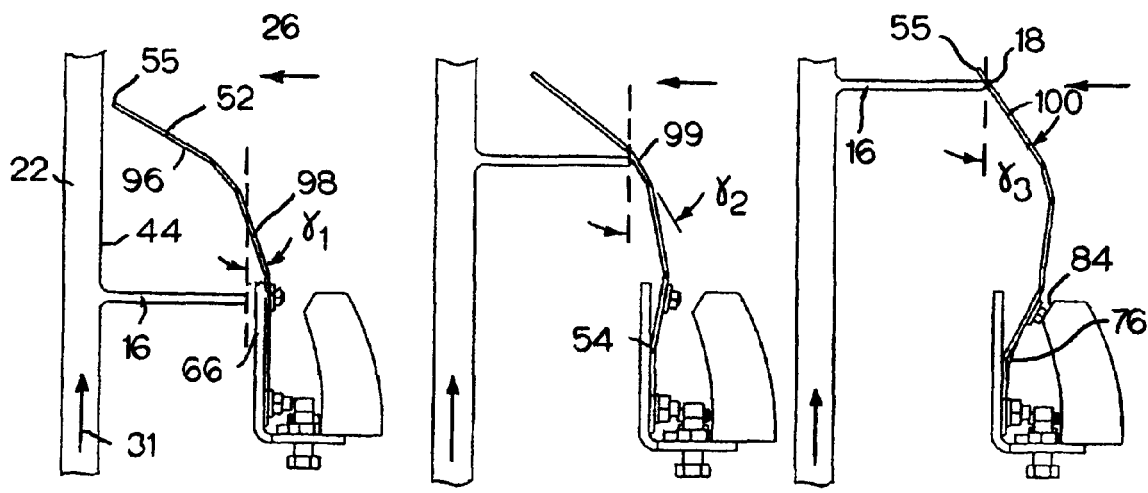
FIGS. 8A-8C are side elevation views of the boot seal of FIGS. 5A-5D illustrating its operation.

The operation of the boot plate seal is illustrated in FIGS. 8A-8C. In FIG. 8A, the boot plate 52 is in its normal rest position. The top of its free end 55 is close to or lightly touching the outer surface 44 of the water screen 22 moving upward as indicated by the arrow 31. The vertical supports 66 act as forward stops limiting the boot plate's downstream advance. The lift element, in this example, a flight 16, is approaching, but not yet contacting the boot plate. The tip 18 of the flight is shown about to contact the proximal facet 98 at a small contact angle $\gamma_1$ of less than 90°. Once the flight tip contacts the upstream concave surface 96 of the boot plate, the boot plate is pushed backward against the spring bias and the water flow 26 by the flight tip, as shown in FIG. 8B. The attachment end 54 of the boot plate defines a hinge edge about which the boot plate pivots. Thus, the flight tip acts as a cam sliding along the boot plate's concave surface, which acts as a cam follower. As the flight tip contacts the transition facet 99, the contact angle $\gamma_2$ is still acute, i.e., less than 90°. The flight tip rides along the distal facet at an acute contact angle of $\gamma_3$, as shown in FIG. 8C. (It should be recognized that each of the contact angles $\gamma_1$-$\gamma_3$ varies along each facet as the boot plate pivots.) Because the pressure of the boot plate against the upward-moving tip increases with contact angle, the small contact angles lessen the driving force required to pull the water screen, as well as wear and tear on the flight. When the free end 55 of the boot plate contacts the flight tip 18, the boot plate is bent backward in the upstream direction. The stop 84 is shown in a position that allows slightly more back-bending to accommodate for variations in flight heights. After the flight tip clears the flight 16, the spring hinge 76 pushes the boot plate back to its rest position shown in FIG. 8A.

Thus, the boot seal prevents debris and fish from flowing into the boot section of a traveling water screen with lift elements without excessively wearing the lift elements. When constructed of stainless steel or other durable materials, the boot plate will last a long time before it has to be replaced.

Although the invention has been described in detail with respect to a few preferred versions, other versions are possible. For example, the spring hinge could be realized other than by sheets of spring steel. As one example, the lower end of the boot plate could be attached to the frame by a conventional hinge with a coil spring attached to bias the boot plate toward the water screen. If the water flow is great enough, a spring may not even be necessary. The force of the current may be sufficient to bias the boot plate toward the water screen. So, as these few examples suggest, the scope of the invention is not meant to be limited to the preferred versions described in detail.

What is claimed is:

1. A boot seal for forming a seal between the upstream side of a vertically traveling water screen and the bottom of a channel of water flowing downstream through the water screen, the boot seal comprising:
    a frame affixed at the channel bottom upstream of the boot section of the water screen system;
    a bent plate extending from an upper edge at or near the outer screen surface to a lower edge;
    a spring hingedly attaching the lower edge of the bent plate to the frame and biasing the upper edge of the bent plate toward the water screen;
    a stop positioned upstream of the upper edge of the bent plate to contact the bent plate to limit the travel of the bent plate about the hinge.

2. A boot seal as in claim 1 wherein the bent plate comprises multiple facets angularly joined.

3. A boot seal as in claim 1 wherein the spring comprises a sheet of spring steel attached between the lower edge of the bent plate and the frame.

4. In a water screen system in which a vertically traveling water screen, comprising a foraminous belt with lift elements extending outwardly from an outer screen surface, transitions from a downward downstream path to an upward upstream path around a wheel disposed at a channel bottom boot section forming a gap between the outer screen surface and the bottom of the channel, an improved boot seal for blocking debris from entering the gap at the upstream end of the boot section, the improved boot seal comprising:
    a bent plate extending from a lower edge to an upper edge at or near the outer screen surface;
    a spring hinge attached to the bent plate at the lower edge at a position upstream of the upward upstream path of the water screen,
    wherein the spring hinge biases the bent plate toward the water screen;
    a stop positioned to contact the bent plate to limit the travel of the bent plate about the hinge.

5. An improved boot seal as in claim 4 wherein the bent plate comprises multiple facets angularly joined.

6. An improved boot seal as in claim 4 wherein the spring hinge comprises a sheet of spring steel attached to the lower edge of the bent plate.

7. An improved boot seal as in claim 4 wherein the bent plate comprises a concave surface facing the water screen.

8. A traveling water screen system comprising:
    a vertically traveling water screen comprising a foraminous belt with lift elements extending outwardly from an outer screen surface, the traveling water screen changing direction from moving downward along a downstream path to moving upward along an upstream path around a wheel disposed in a channel bottom boot section forming a gap below the outer screen surface and the bottom of the channel;
    a boot seal for blocking debris from entering the gap at the upstream end of the boot section, the boot seal comprising:
        a frame affixed at the channel bottom upstream of the boot section of the water screen system;
        a boot plate extending from an upper edge near the outer screen surface to a lower edge and defining a concave cam surface facing the water screen;
        a hinge between the boot plate at the lower edge and the frame, the hinge including a spring to bias the boot plate toward the water screen and to allow the boot plate to pivot at the hinge away from the outer screen surface against the bias as a lift element slides along the concave cam surface of the boot plate;
        wherein the upper edge of the boot plate when not in contact with a lift element is spaced slightly away from the outer screen surface.

9. A traveling water screen system as in claim 8 wherein the boot seal further comprises first and second stops mounted on the frame that limit the range of motion of the boot plate pivoting at the hinge by contact with a lift element advancing upward along the upstream path.

10. A traveling water screen system as in claim 8 wherein the boot plate includes a plurality of facets joined at bend angles.

11. A traveling water screen system as in claim 10 wherein the sum of the supplementary angles of all the bend angles of the boot plate does not exceed 90°.

12. A traveling water screen system as in claim 8 wherein the contact angle between the direction of motion of the lift elements and the cam surface of the boot plate at their point of contact is always less than 90°.

13. A method for forming a seal at the boot section of a water screen system between the upstream outer surface of a traveling water screen and the bottom of a channel of water, comprising:
    mounting a bent metal plate at the bottom of a channel upstream of the upward-traveling outer surface of a water screen at a hinge;
    positioning the distal edge of the plate opposite the hinge at the outer surface of the water screen;
    biasing the plate at the hinge toward the water screen to allow the distal edge of the plate to ride along the outer surface of the upward-traveling water screen and any salient structures protruding outward of the outer surface as the plate pivots at the hinge;
    positioning a stop to contact the plate to limit the travel of the plate about the hinge.

* * * * *